United States Patent
Morizawa

(10) Patent No.: US 8,117,573 B2
(45) Date of Patent: Feb. 14, 2012

(54) VERIFICATION-SCENARIO GENERATING APPARATUS, VERIFICATION-SCENARIO GENERATING METHOD, AND COMPUTER PRODUCT

(75) Inventor: Rafael Kazumiti Morizawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 12/230,110

(22) Filed: Aug. 22, 2008

(65) Prior Publication Data
US 2009/0100211 A1 Apr. 16, 2009

(30) Foreign Application Priority Data
Oct. 10, 2007 (JP) ................................. 2007-264716

(51) Int. Cl.
*G06F 17/50* (2006.01)
(52) U.S. Cl. ......... 716/106; 716/107; 716/111; 716/137
(58) Field of Classification Search .......... 716/100–107, 716/111, 137
See application file for complete search history.

(56) References Cited

U.S. PATENT DOCUMENTS
2008/0222282 A1* 9/2008 Monaghan et al. ........... 709/224

FOREIGN PATENT DOCUMENTS
WO 02/073411 9/2002

* cited by examiner

*Primary Examiner* — Paul Dinh
(74) *Attorney, Agent, or Firm* — Staas & Halsey LLP

(57) ABSTRACT

Hardware blocks respectively of an arbitrary access origin and an arbitrary access destination that are mutually accessible are extracted from among a plurality of hardware blocks constituting a bus system to be verified, and a path reaching from the access-origin hardware block to the access-destination hardware block is searched for. For each path found, a verification scenario is generated to verify transactions of the access-origin hardware block for a case where access to an address range assigned to the access-destination hardware block occurs, and the verification scenario is output being correlated with the path that corresponds thereto.

9 Claims, 13 Drawing Sheets

FIG.9

| ADDRESS | | ACCESS DESTINATION HARDWARE BLOCK | ACCESS PATTERN | ACCESS ORIGIN HARDWARE BLOCK |
|---|---|---|---|---|
| FROM | TO | | | |
| 0x0000_0000 | 0x1FFF_FFFF | BRIDGE | SINGLE TRANSFER | CPU, DEVICE A |
| 0x2000_0000 | 0x2000_FFFF | DEVICE B | BURST TRANSFER | CPU, DEVICE A |
| 0x2001_0000 | 0xFFFF_FFFF | DEVICE A | SINGLE TRANSFER | BRIDGE |
| | | NOT USED | SINGLE/BURST TRANSFER | CPU, BRIDGE |
| | | | - | - |

900

910 — 900-1, 900-2, 900-3

920, 930, 940

| PATH NAME | SCENARIO NAME |
|---|---|
| P1 | SCENARIO 1 |
| P4 | SCENARIO 4 |
| ⋮ | ⋮ |
| P4, P5 | SCENARIO 4\|\|SCENARIO 5 |
| ⋮ | ⋮ |
| P4, P5, P6, P7 | SCENARIO 4\|\|SCENARIO 5\|\|SCENARIO 6\|\|SCENARIO 7 |

VERIFICATION-SCENARIO GENERATING APPARATUS, VERIFICATION-SCENARIO GENERATING METHOD, AND COMPUTER PRODUCT

CROSS-REFERENCE TO RELATED APPLICATIONS

This application is based upon and claims the benefit of priority from the prior Japanese Patent Application No. 2007-264716, filed on Oct. 10, 2007, the entire contents of which are incorporated herein by reference.

BACKGROUND OF THE INVENTION

1. Field of the Invention

The present invention relates to verification scenario generation and the verification of a bus system of a system LSI.

2. Description of the Related Art

Generally, in verifying a bus system of system large-scale integrations (LSI), whether data communication between an access-origin hardware block and an access-destination hardware block that are mutually accessible operates normally is checked based on a memory map. However, recently, verification of a bus system becomes difficult due to the increasingly large size and complexity of system LSIs. Therefore, the work load for and the work term for the verification work have increased and improved work efficiency by reducing the verification term is required.

To facilitate higher efficiency, for example, an approach has been proposed that realizes verification of a system LSI including a CPU, a memory, and a bus that connects the CPU and the memory, where verification is realized by a loop queue operation of an instruction queue included in the CPU (see, for example, International Patent Application Pamphlet No. 2002/073411). Thereby, a branching instruction is unnecessary because the same test program can be repeatedly executed and, therefore, the testing efficiency for a memory chip can be improved.

However, according to the above conventional technique, sufficient information to identify a path from an access origin to an access destination is not defined in a memory map. Therefore, a path necessary for generating a verification scenario can not be identified from the memory map. Thus, verification of data damage is insufficient for the case where plural accesses to an access destination occur, arising in a problem of the verification quality being degraded.

On the other hand, the extraction of path information from a design specification by a person who understands and verifies the design specification of the system LSI, etc, can be considered. However, the description contents of the design specification are compiled from the viewpoint of designing and, therefore, the extracting work of the path information may become difficult. Therefore, a problem arises in that the load on the person who does the verification is increased.

Due to the larger scale and greater complexity of system LSI, the number of paths connected to a specific access destination increases arising in the problem that covering all the paths manually is difficult. Furthermore, correction work of a circuit design becomes necessary as a result of oversights during verification and, therefore, increased load on the person who designs the circuit and extension of the design term are caused.

SUMMARY OF THE INVENTION

It is an object of the present invention to at least solve the above problems in the conventional technologies.

A computer-readable recording medium according to one aspect of the present invention stores therein a computer program for verification scenario generation. The computer program causes a computer to execute extracting from among a plurality of hardware blocks that constitute a bus system to be verified, an access-origin hardware block and an access-destination hardware block that are mutually accessible; searching for a path reaching from the access-origin hardware block to the access-destination hardware block; generating, for each path found at the searching, a verification scenario to verify a transaction of the access-origin hardware block for a case where access to an address range assigned to the access-destination hardware block occurs; and outputting the verification scenario correlated with the path corresponding thereto.

A verification-scenario generating apparatus according to another aspect of the present invention includes an extracting unit that extracts from among a plurality of hardware blocks that constitute a bus system to be verified, an access-origin hardware block and an access-destination hardware block that are mutually accessible; a searching unit that searches for a path reaching from the access-origin hardware block to the access-destination hardware block; a generating unit that, for each path found by the searching unit, generates a verification scenario to verify a transaction of the access-origin hardware block for a case where access to an address range assigned to the access-destination hardware block occurs; and an output unit that outputs the verification scenario correlated with the path corresponding thereto.

A verification-scenario generating method according to still another aspect of the present invention includes extracting from among a plurality of hardware blocks that constitute a bus system to be verified, an access-origin hardware block and an access-destination hardware block that are mutually accessible; searching for a path reaching from the access-origin hardware block to the access-destination hardware block; generating, for each path found at the searching, a verification scenario to verify a transaction of the access-origin hardware block for a case where access to an address range assigned to the access-destination hardware block occurs; and outputting the verification scenario correlated with the path corresponding thereto.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 9 is a schematic of an example of a memory map;

DETAILED DESCRIPTION OF THE PREFERRED EMBODIMENTS

Exemplary embodiments according to the present invention are explained in detail below with reference to the accompanying drawings.

Figure 1:
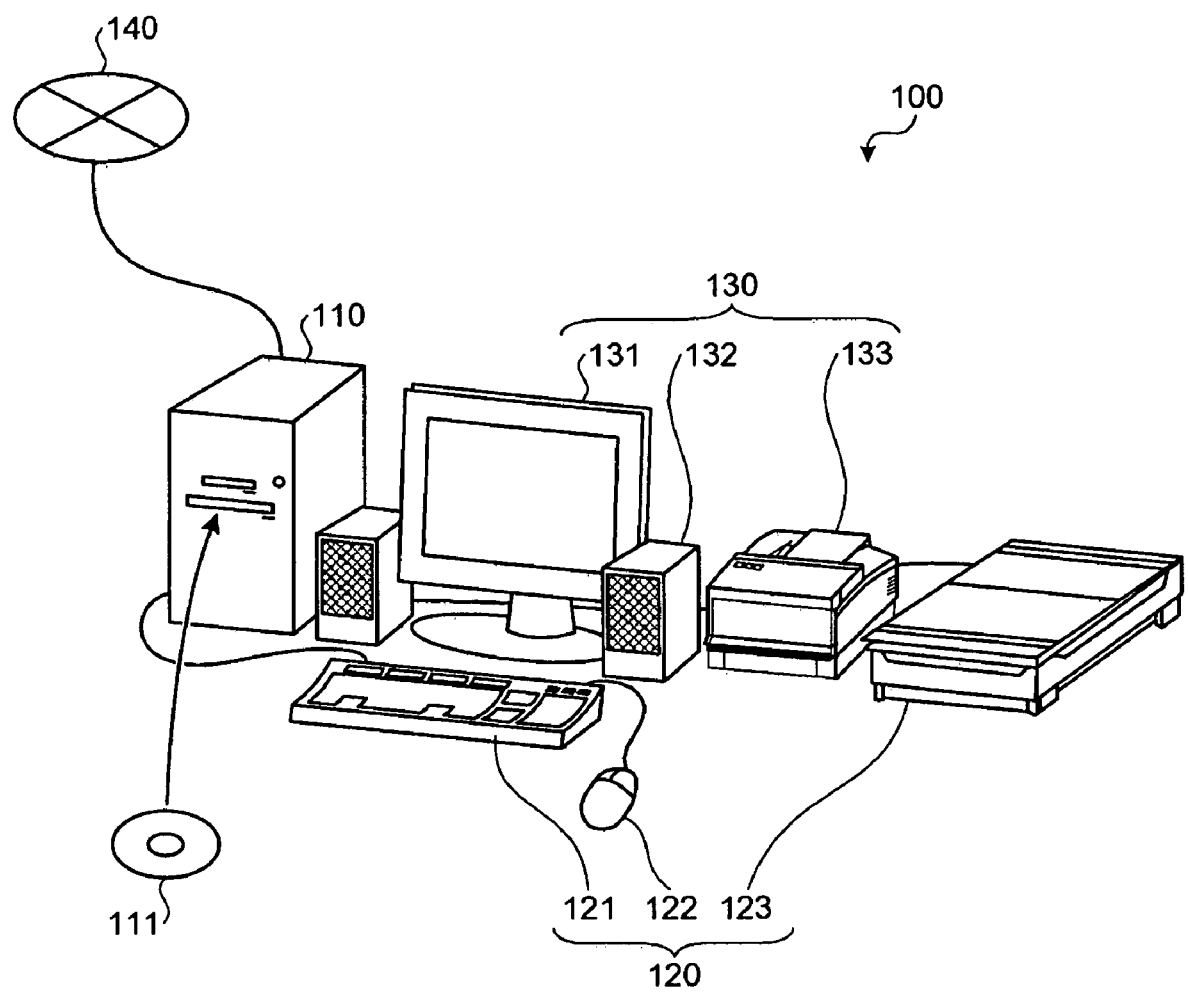
FIG. 1 is a block diagram of a verification-scenario generating apparatus according to an embodiment of the present invention.

FIG. 1 is a block diagram of a verification-scenario generating apparatus according to an embodiment of the present invention. As shown in FIG. 1, a verification-scenario generating apparatus 100 includes a computer 110, an input device 120, and an output device 130, and can be connected with a network 140, e.g., a local area network (LAN), a wide area network (WAN), or the Internet through a non-depicted router or a modem.

The computer 110 includes a central processing unit (CPU), a memory, and an interface. The CPU controls the entire verification-scenario generating apparatus 100. The memory is formed of, for example, read-only memory (ROM), a random access memory (RAM), a hard disk (HD), an optical disk 111, or a flash memory. The memory is used as a work area for the CPU.

Various programs are stored in the memory and loaded in response to a command from the CPU. The reading/writing data from/into the HD and the optical disk 111 is controlled by a disk drive. The optical disk 111 and the flash memory are removable. The interface controls input from the input device 120, output to the output device 130, and transmission/reception with respect to the network 140.

As the input device 120, a keyboard 121, a mouse 122, and a scanner 123 are adopted. The keyboard 121 includes keys to input, for example, characters, numeric figures, and various kinds of instructions, and data is input through the keyboard 121. The keyboard 121 may be a touch panel type. The mouse 122 is used to move a cursor, select a range, move a window, or change a window size. The scanner 123 optically reads an image as image data, which is stored in the memory of the computer 110. The scanner 123 may have an optical character recognition (OCR) function.

As the output device 130, a display 131, a speaker 132, a printer 133, and others are adopted. The display 131 displays a cursor, an icon, or a tool box as well as data, such as text, an image, and function information. The speaker 132 outputs sound, e.g., a sound effect or a text-to-voice converted sound. The printer 133 prints image data or text data.

Figure 2:
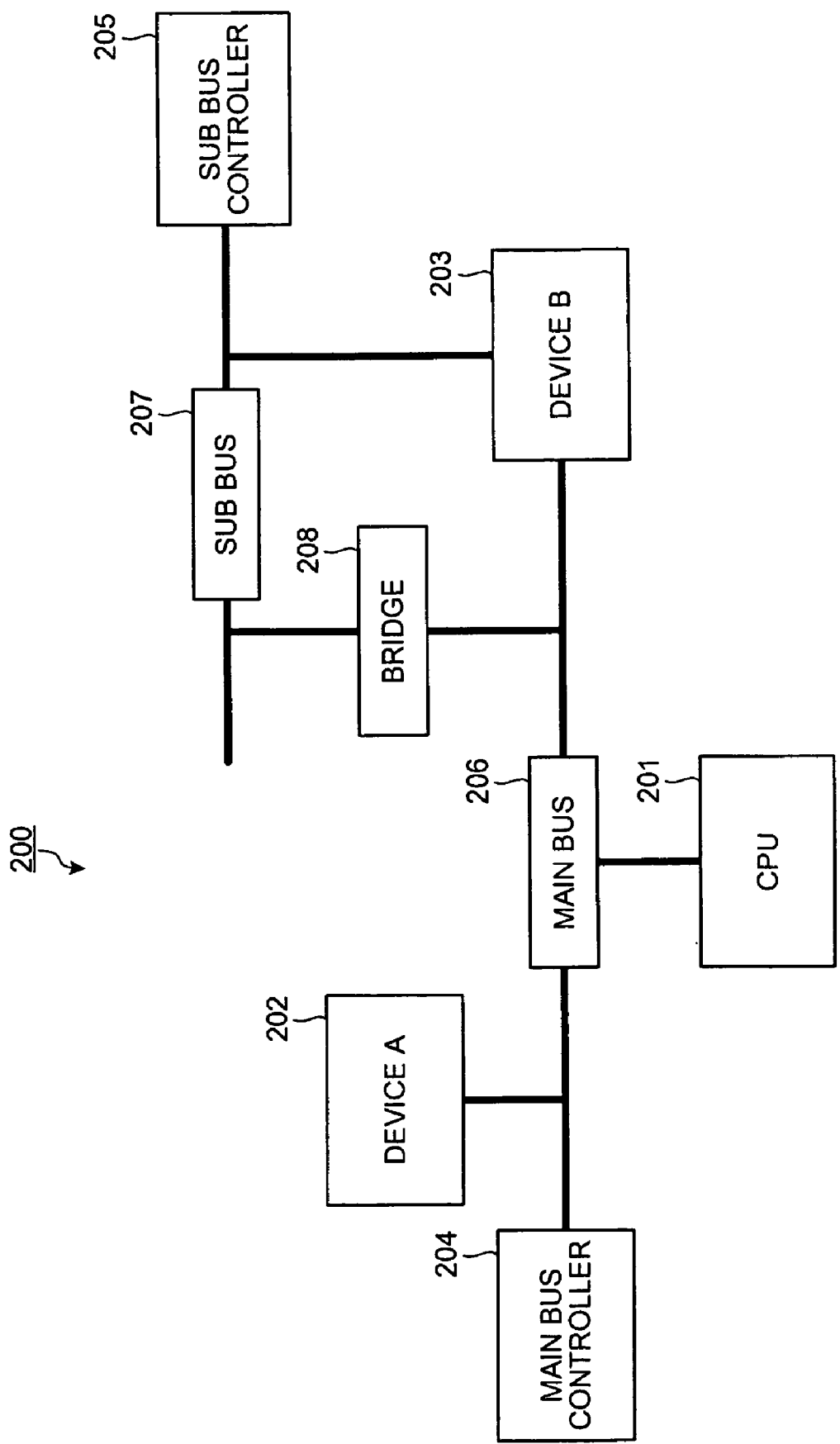
FIG. 2 depicts a configuration of an example of a bus system subject to verification according to the embodiment.

FIG. 2 depicts the configuration of an example of a bus system subject to verification according to the embodiment. In FIG. 2, a portion of the bus system is extracted and depicted. As shown in FIG. 2, a bus system 200 includes a CPU 201, a device "A" 202, a device "B" 203, a main bus controller 204, and a sub bus controller 205.

The CPU 201 is a hardware block that manages the control of the entire bus system 200. The device A 202 and the device B 203 are hardware blocks that each have functions such as interfacing to control data communication with an external destination and image processing. The main bus controller 204 is a hardware block that controls data communication on a main bus. The sub bus controller 205 is a hardware block that controls data communication on a sub bus.

The above hardware blocks (201 to 204) are connected through the main bus 206, the sub bus 207, and a bridge 208. In this case, assuming that access-origin hardware blocks that can access the device B 203 are the CPU 201 and the device A 202, description is given for a path from the access-origin hardware blocks to the access-destination hardware block.

Figure 3:
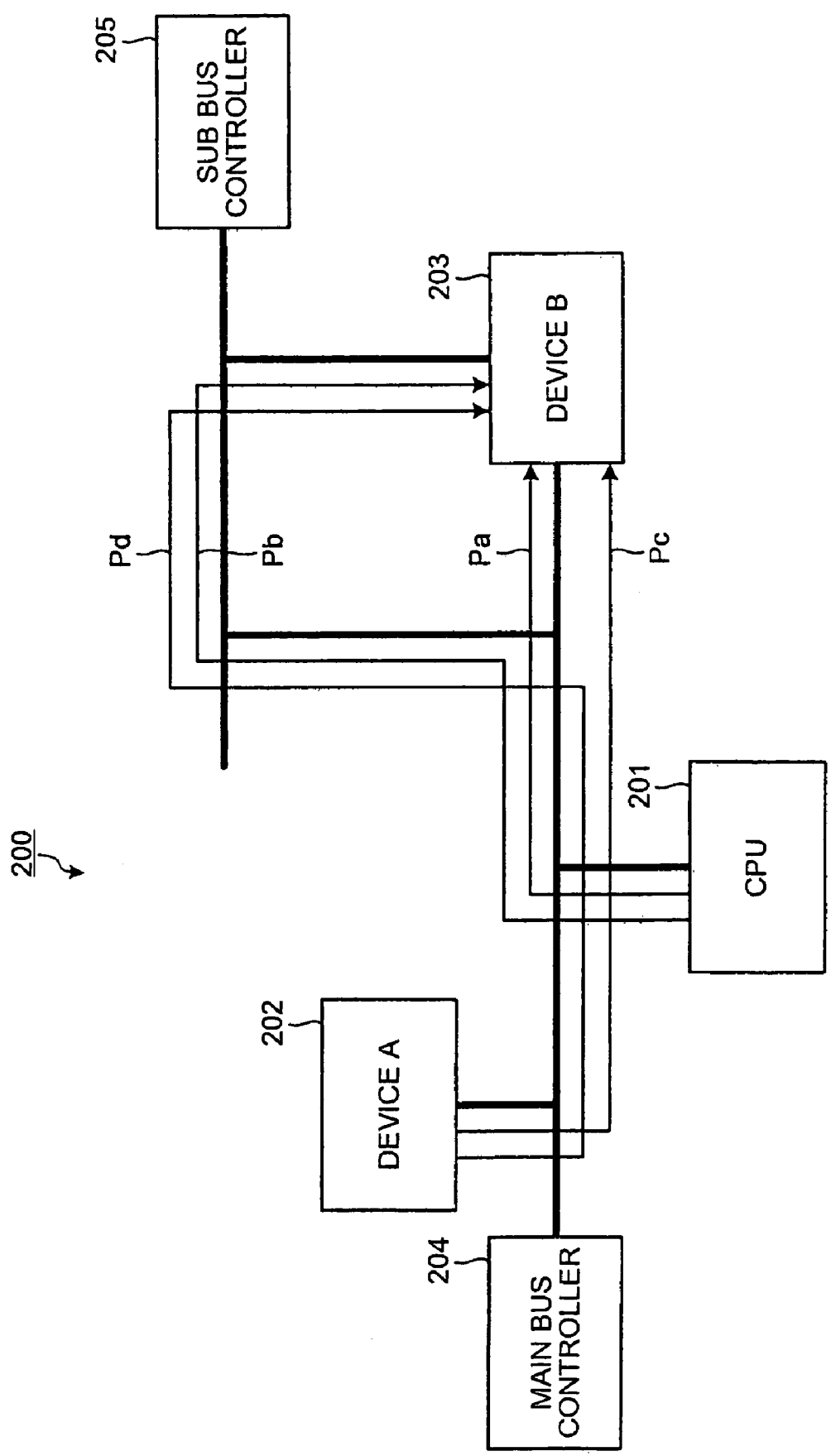
FIG. 3 is a schematic of an example of paths in the bus system.

FIG. 3 is a schematic of an example of paths in the bus system. As shown in FIG. 3, a path Pa is a path of direct access from the CPU 201 to the device B 203. A path Pb is a path of access from the CPU 201 to the device B 203 through the bridge 208 (see FIG. 2). A path Pc is a path of direct access from the device A 202 to the device B 203. A path Pd is a path of access from the device A 202 to the device B 203 through the bridge 208.

As described above, when plural paths for access to the device B 203 are present, a verification scenario (parallel scenario) formed by combining verification scenarios (single scenarios) respectively for the paths Pa to Pd must be generated to verify the presence or the absence of data damage in the case where competing access to the device B 203 occurs.

In the embodiment, a path is automatically searched for reaching from an access-origin hardware block to an access-destination hardware block that can mutually communicate in the bus system 200, and a verification scenario is automatically generated for each path found. Thereby, efficient and collective generation of a verification scenario necessary for the verification of the bus system is realized.

Figure 4:
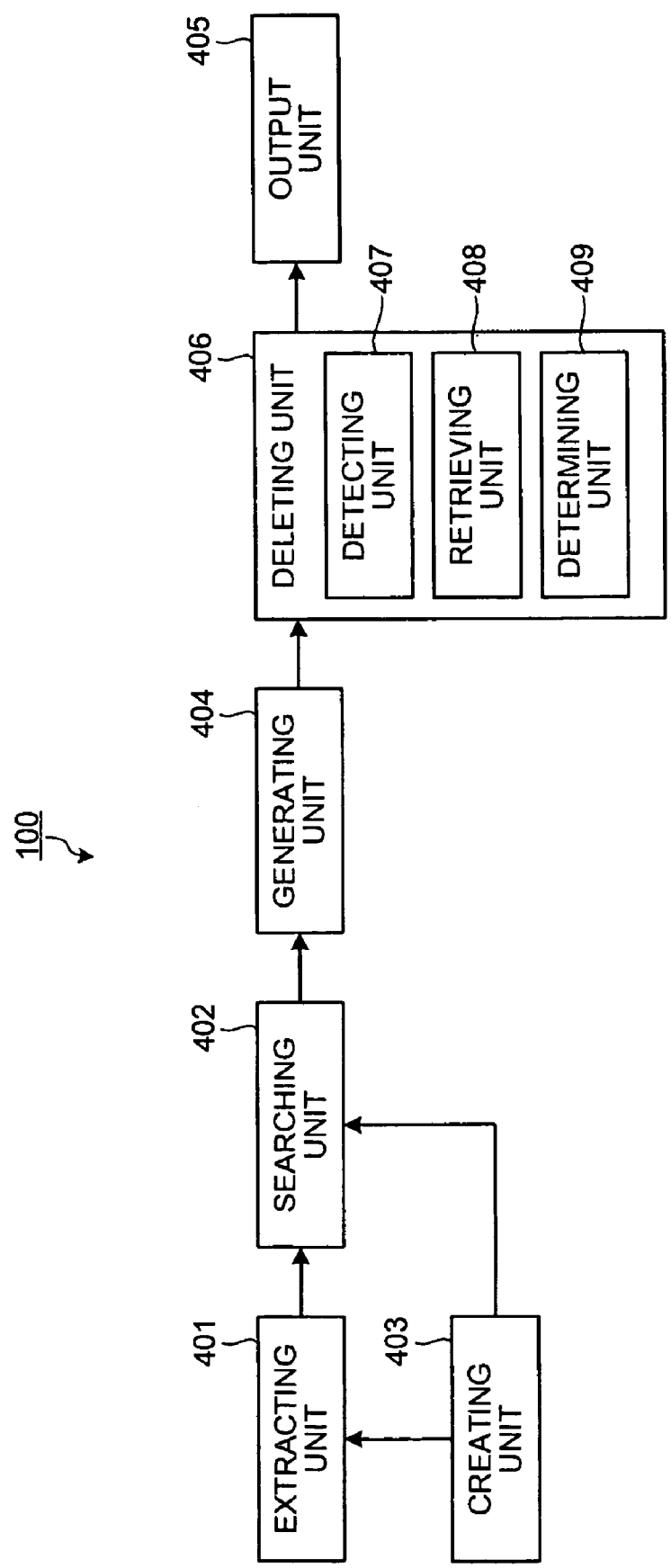
FIG. 4 is a functional diagram of the verification-scenario generating apparatus.

FIG. 4 is a block diagram of a functional configuration of the verification-scenario generating apparatus according to the embodiment. As shown in FIG. 4, the verification-scenario generating apparatus 100 includes an extracting unit 401, a searching unit 402, a creating unit 403, a generating unit 404, an output unit 405, a deleting unit 406, a detecting unit 407, a retrieving unit 408, and a determining unit 409.

The respective functions of the units 401 to 409 are realized by causing the CPU to execute a corresponding program stored in a memory. Data output from the units 401 to 409 is stored in a memory. Connection destinations indicated by arrows in FIG. 4 read, from the memory, the data output from the units at the connection origin and cause the CPU to execute programs concerning the functions, respectively.

The extracting unit 401 has a function of extracting from among plural hardware blocks constituting a bus system to be verified, an arbitrary access-origin hardware block and an arbitrary access-destination hardware block that are mutually accessible. More specifically, the extracting unit 401 may extract from among the hardware blocks, an arbitrary hardware block that is an access destination and also extract an access-origin hardware block that can access the access-destination hardware block extracted.

A bus system is a communication network that realizes data communication among hardware blocks constituting an LSI and, for example, is the bus system 200 shown in FIG. 2. A bus controller, a processor (CPU), a memory, dedicated hardware, etc., can be listed as a hardware block. A bus connects hardware blocks to each other.

The searching unit 402 has a function of searching for a path that reaches from the access-origin hardware block extracted by the extracting unit 401 to an access-destination hardware block. In the embodiment, searching is executed to search for paths that directly access an access-destination hardware block from an access-origin hardware block and paths that access the access-destination hardware block from the access-origin hardware block through a bridge that bridges a connection with a different bus line in the bus system.

In this case, all the paths that can logically be assumed are searched for regardless of whether the paths physically exist in the bus system. More specifically, using a directed graph showing the logical connection relationships among the hardware blocks, paths may be searched for that reach an access-destination hardware block from an access-origin hardware block.

The creating unit 403 has a function of creating a directed graph of a bridge connecting different bus lines in the bus system, the access-origin hardware block, and the access-destination hardware block, each represented as a node. A directed graph is a chart formed by connecting an access-origin hardware block, an access-destination hardware block, and a bridge by edges each having directivity.

When a path is searched for using a directed graph, the extracting unit 401 first extracts an arbitrary access-destination hardware block from the directed graph created by the creating unit 403. Subsequently, tracing a directed edge that connects nodes in the directed graph, the searching unit 402 searches for a path from the extracted access-origin hardware block to an access-origin hardware block that can access the access-destination hardware block.

The generating unit 404 has a function of generating, for each path found by the searching unit 402, a verification scenario to verify transactions of an access-origin hardware block for a case where an access-destination hardware block that has been assigned an address range is accessed.

Figure 5:
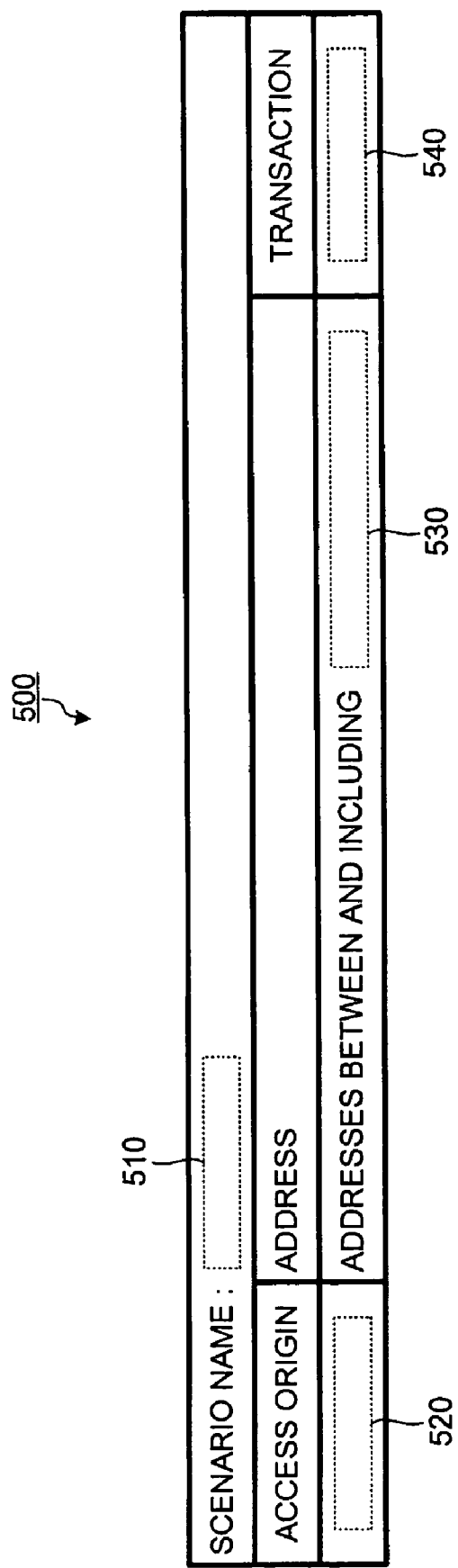
FIG. 5 is a schematic of an example of a scenario template.

In the generation of a verification scenario, for example, a scenario template stored in advance in a storage area, such as a ROM or a RAM, is utilized. FIG. 5 is a schematic of an example of a scenario template. As shown in FIG. 5, a scenario template 500 is a template to generate a verification scenario to verify transactions of an access-origin hardware block for the case where a specific access-destination hardware block is accessed.

The scenario template 500 is provided with insertion positions 510 to 540 into which given character strings are inserted. In this case, the insertion position 510 is an insertion position into which a scenario name that identifies a verification scenario is inserted. The insertion position 520 is an insertion position into which the name of an access-origin hardware block is inserted.

The insertion position 530 is an insertion position into which an address range assigned to the access destination block is inserted. The insertion position 540 is an insertion position into which the type of a transaction of the access-origin hardware block is inserted. The generating unit 404 generates a verification scenario for each path by inserting respective character strings corresponding to the insertion positions 510 to 540.

The generating unit 404, when plural paths are found by the searching unit 402, has a function of generating a verification scenario by combining respective verification scenarios for the paths, for verification in a case where competing access occurs at an address range assigned to an access-destination hardware block.

A combination of verification scenarios is a combination of respective verification scenarios for a case where access is to a specific access-destination hardware block and is formed by combining the scenarios such that the scenarios are accessible in parallel. In this case, by covering all of the combinations of verification scenarios that operate in parallel (single scenarios), a verification scenario taking into account competing access (parallel scenario) is generated.

For example, it is assumed that three verification scenarios (having scenario names: scenario A, scenario B, and scenario C) exist for a case where access occurs at same the access-destination hardware block. In this case, combinations of the verification scenarios that operate in parallel to each other are four and include "the scenario A and the scenario B", "the scenario A and the scenario C", "the scenario B and the scenario C", and "the scenario A, the scenario B, and the scenario C".

As described above, when plural paths are present, a verification scenario taking into account competing access (parallel scenario) is automatically generated by combining the respective verification scenarios (single scenarios) for the paths. By enumerating the scenario names (for example, the scenario A and the scenario B) in parallel with each other, a combination of the verification scenarios is represented as "scenario A∥scenario B".

The output unit 405 has a function of outputting a verification scenario generated by the generating unit 404 and correlated with a path corresponding thereto. The output form used by the output unit 405 may be any one of screen display on the display 131, print out by the printer 133, data output to a memory (for storage), and transmission to an external computer apparatus. More specifically, the output unit 405 may output a correlation table indicating the verification scenario and the path that corresponds thereto.

The deleting unit 406 has a function of deleting a verification scenario for a path including an access-origin hardware block and an access-destination hardware block that are the same hardware block. More specifically, the deleting unit 406 deletes a verification scenario that verifies a case where an access-origin hardware block causes transactions addressed to itself. This verification scenario verifies a transaction that can not exist in a practical bus system.

Figure 6:
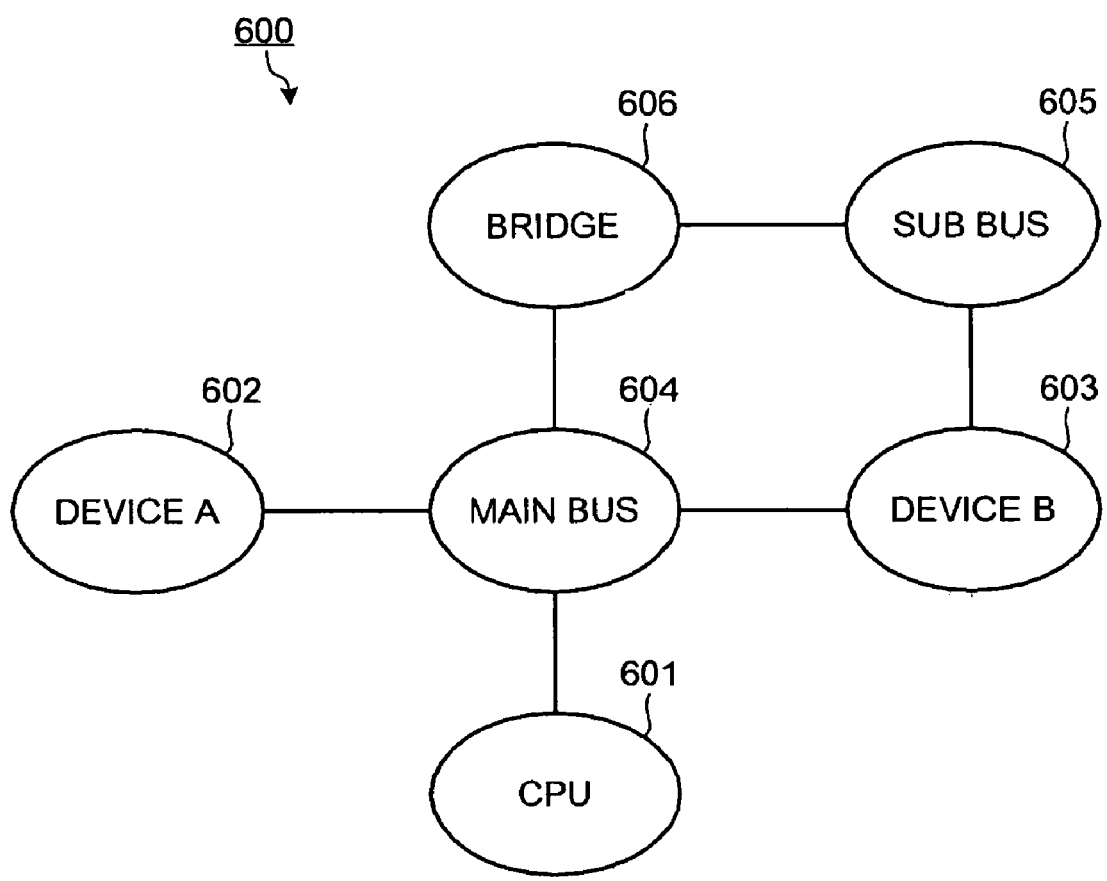
FIG. 6 is a schematic of an example of a configuration model.

The deleting unit 406 may delete a verification scenario for a path that does not physically exist, by referring to a configuration model that represents the configuration of a bus system as a model. Description is given for the configuration model that shows as a model the configuration of the bus system 200 shown in FIG. 2. FIG. 6 is a schematic of an example of a configuration model.

As shown in FIG. 6, a configuration model 600 includes a CPU model 601, a device A model 602, a device B model 603, a main bus model 604, a sub bus model 605, and a bridge model 606. The configuration model 600 can be created by depicting as nodes, hardware blocks, bridges, and buses in the bus system 200 in a graph and by connecting the nodes that are physically connected.

With reference to the configuration model 600, paths that do not physically exist are identified among the paths found by the searching unit 402. More specifically, the paths that do not physically exist among the paths that are found by the searching unit 402 and that can be logically assumed are determined by referring to the connection relationships among the nodes in the configuration model 600.

Description is given for a specific approach of a deleting process of deleting the verification scenarios for the paths that do not physically exist. The detecting unit 407 refers to the connection relationships among the nodes in a configuration model (for example, the configuration model 600) and the detecting unit 407 detects access-origin hardware blocks and access-destination hardware blocks that belong to the same bus line in the bus system.

Subsequently, the retrieving unit 408, among the paths found by the searching unit 402, retrieves a path that passes through another bus line different from the above bus line and reaches an access-destination hardware block from an access-origin hardware block detected by the detecting unit 407.

The determining unit 409 determines whether the access-destination hardware block in the path retrieved by the retrieving unit 408 belongs to the other bus line. When it is determined that the hardware block does not belong to the other bus line, the deleting unit 406 deletes the verification scenario that is correlated with the path retrieved by the retrieving unit 408.

When the deleting unit 406 deletes the verification scenario, the output unit 405 correlates and outputs the remaining verification scenarios and the paths corresponding thereto. The various processes by the above functional units 401 to 409 are executed based on a memory map and circuit information of the bus system to be verified. The various processes based on the memory map are described with reference to an embodiment described later.

Figure 7:
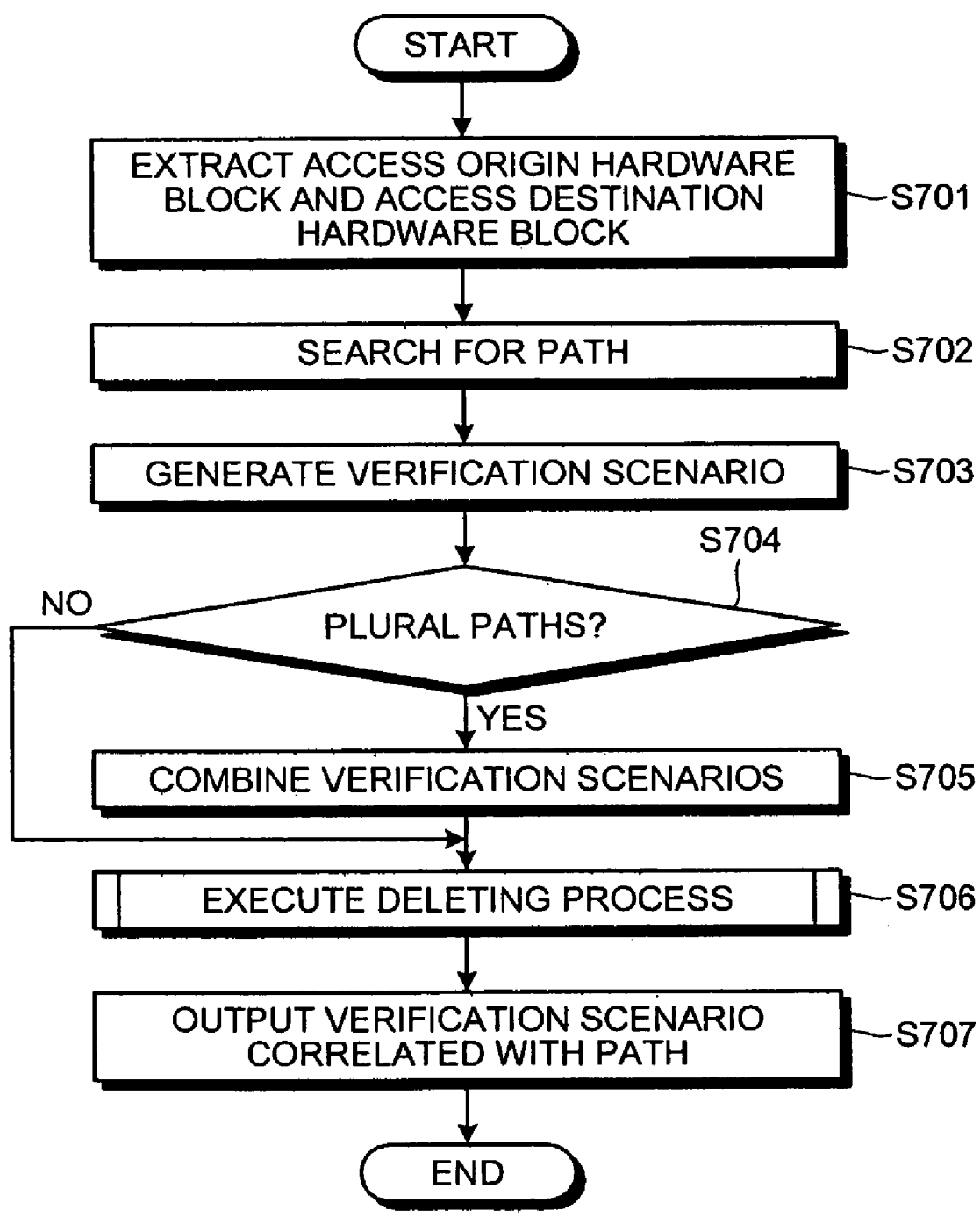
FIG. 7 is a flowchart of a verification-scenario generating process of the verification-scenario generating apparatus.

FIG. 7 is a flowchart of a verification-scenario generating process of the verification-scenario generating apparatus according to the embodiment. As shown in the flowchart of FIG. 7, the extracting unit 401 first extracts hardware blocks respectively of an arbitrary access origin and an arbitrary access destination that are mutually accessible, from among plural of hardware blocks constituting a bus system to be verified (step S701). The searching unit 402 searches for a path reaching from the access-origin hardware block extracted by the extracting unit 401 to the access-destination hardware block (step S702).

The generating unit 404, for each path found by the searching unit 402, generates a verification scenario to verify transactions of the access-origin hardware block in a case where a range of addresses is assigned to the access-destination hardware block (step S703).

Whether plural paths are found at step S702 is judged (step S704) and, when plural paths are found (step S704: YES), the generating unit 404 generates a verification scenario for a case where competing access occurs at the address range, by combining verification scenarios respectively for the paths (step S705).

The deleting unit 406 executes a deleting process of deleting unnecessary verification scenarios (step S706). Finally, the output unit 405 correlates and outputs the verification scenario generated by the generating unit 404 with the path corresponding thereto (step S707), and the series of the processes according to the flowchart ends. When plural paths are not found at step S704 (step S704: NO), the procedure proceeds to step S706.

Figure 8:
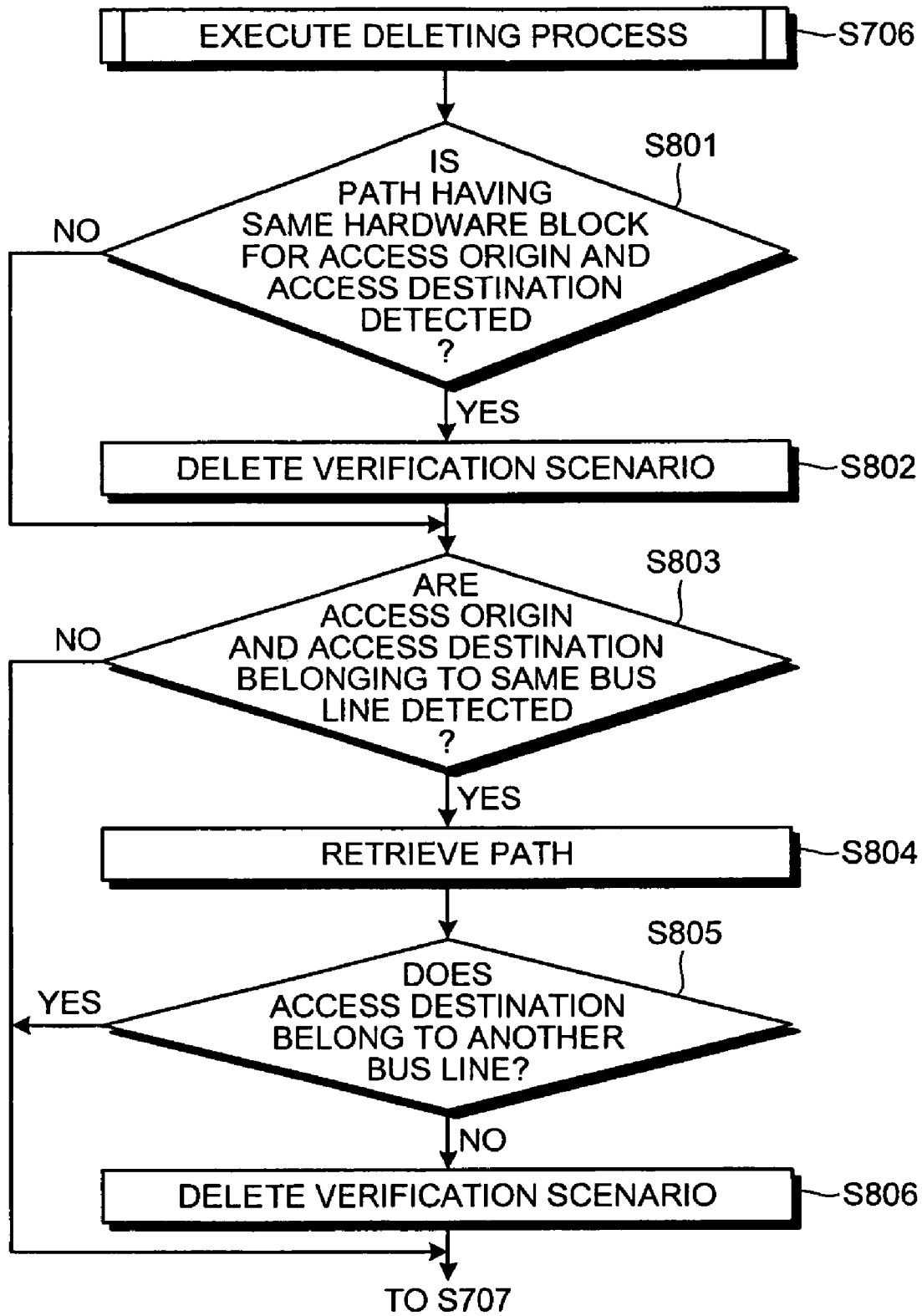
FIG. 8 is a flowchart of a deleting process.

Description is given for a deleting process at step S706 shown in FIG. 7. FIG. 8 is a flowchart of the deleting process. As shown in the flowchart of FIG. 8, it is judged whether a path including an access-origin hardware block and an access-destination hardware block that are the same hardware block is detected from among the paths found by the searching unit 402 (step S801).

When such a path is detected (step S801: YES), the deleting unit 406 deletes the verification scenario of the detected path (step S802). Subsequently, the detecting unit 407 judges whether any hardware blocks of an access origin and of an access destination belonging to the same bus line in the bus system are detected (step S803).

When hardware blocks of the access origin and the access destination are detected (step S803: YES), the retrieving unit 408 retrieves from among the paths found by the searching unit 402, a path that passes through another bus line different from the bus line in reaching from the access-origin hardware block detected by the detecting unit 407 to the access-destination hardware block (step S804).

Subsequently, the determining unit 409 determines whether the access-destination hardware block in the path retrieved by the retrieving unit 408 belongs to the other bus line (step S805). When it is determined that the hardware block does not belong to the other bus line (step S805: NO), the deleting unit 406 deletes the verification scenario for the path retrieved by the retrieving unit 408 (step S806) and the procedure proceeds to step S707 shown in FIG. 7.

When no path is detected at step S801 (step S801: NO), the procedure proceeds to step S803. When no hardware block of the access origin or the access destination is detected at step S805 (step S803: NO) and when it is determined that the hardware block belongs to the other bus line at step S805 (step S805: YES), the procedure proceeds to step S707.

The embodiment of the present invention enables collective automatic generation of a verification scenario to verify transactions of an access-origin hardware block for the case where a hardware block of a specific access destination in a bus system to be verified is accessed. Thereby, oversight in verification of the transactions of the access-origin hardware block can be prevented, enabling improvement of the verification quality to be facilitated.

By combining verification scenarios respectively for the paths, the embodiment enables collective and automatic generation of a verification scenario to verify data damage for a case where plural accesses occur at a specific access-destination hardware block. Thereby, oversight in verification that is executed when data damage during parallel access is verified can be prevented and improvement of the verification quality can be facilitated.

The embodiment enables deletion of unnecessary verification scenarios for verifying cases where transactions addressed to the access-origin hardware block itself occur. The embodiment enables deletion of unnecessary verification scenarios for paths that do not physically exist within the bus system configuration. As a result, unnecessary verifying processes can be deleted and higher efficiency of the verification work can be facilitated.

By utilizing the directed graph that represents the logical connections among hardware blocks in the bus, the embodiment enables searching for a path from an access-origin hardware block to an access-destination hardware block that are mutually accessible. Utilizing the configuration model of the bus system, a path necessary for the verification can be efficiently and correctly identified by deleting the paths that do not physically exist, among the paths found.

Description is given for an example of the above embodiment. In the example, the various processes by the above functional units 401 to 409 are executed based on the specification information concerning the data communication defined in the memory map. In the example, the hardware blocks share only one memory map for the entire bus system.

FIG. 9 is a schematic of an example of the memory map. As shown in FIG. 9, a memory map 900 includes specification information items 900-1 to 900-3 concerning the data communication in the bus system (see FIG. 2) for each address. In this case, a reference numeral "910" denotes an address range to access an access-destination hardware block.

A reference numeral "920 " denotes the name of an access-destination hardware block. A reference numeral "930 " denotes the type of transaction (access patterns) available to the access-origin hardware block. A reference numeral "940 " denotes the name(s) of the access-origin hardware block(s). In the example, combinations each of an access-origin hardware block and an access-destination hardware block that are mutually accessible are represented by the combinations of the hardware blocks listed as indicated by reference numerals 920 and 940.

Taking, as an example, the specification information item 900-2, the CPU 201 and the bridge 208 are defined as the access-origin hardware blocks that can access the device A 202 (the access destination) that is assigned with an address range of "0x2000_0000 to 0x2000_FFFF". Single transfer or burst transfer is defined as an access pattern that indicates the type of the transactions.

In the example, the bridge is handled as a hardware block having a function of relaying data transmitted from an access-origin hardware block to an access-destination hardware block. The memory map 900 is input into the verification-scenario generating apparatus 100 by, for example, by a user operating the input device 120 such as the keyboard 121 and the mouse 122 shown in FIG. 1.

Figure 10:
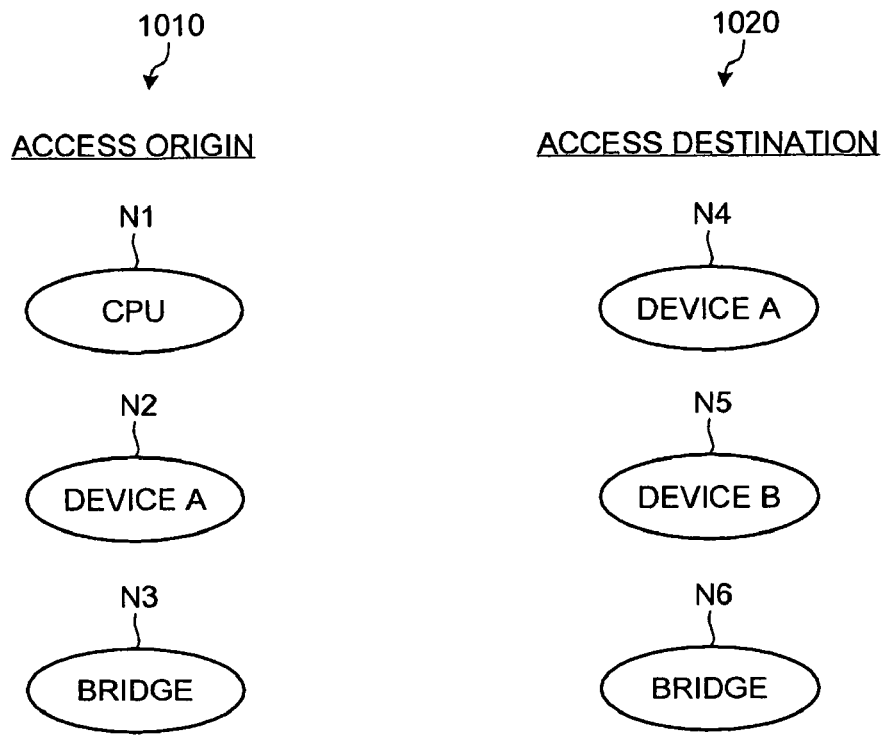
FIGS. 10 to 12 are schematics of a creating process.
Figure 11:
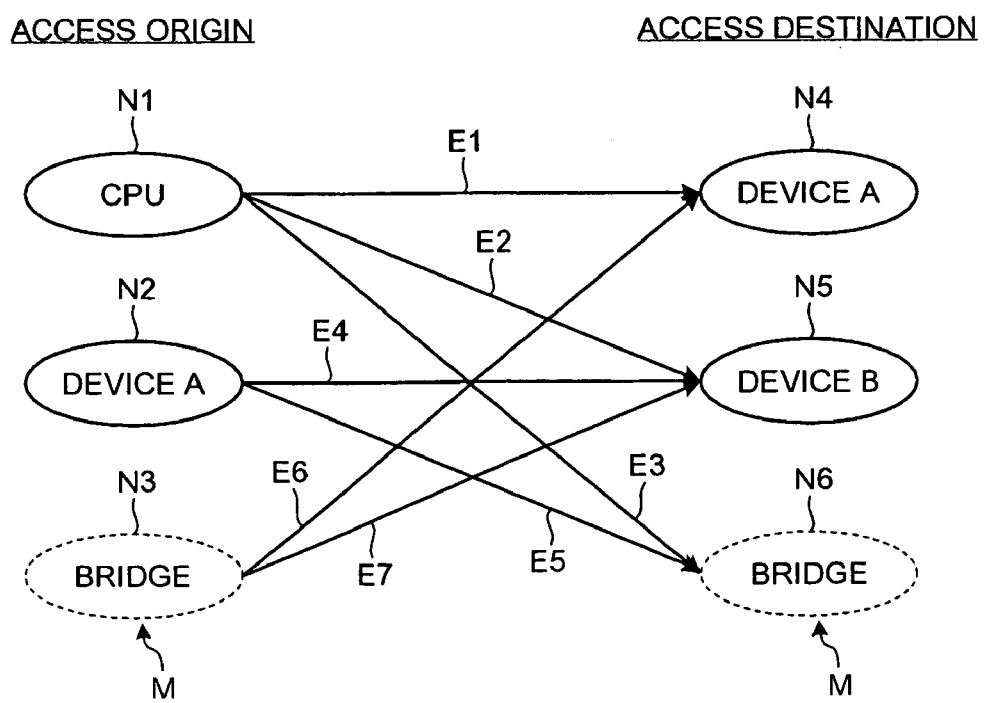
Figures 12, 13:
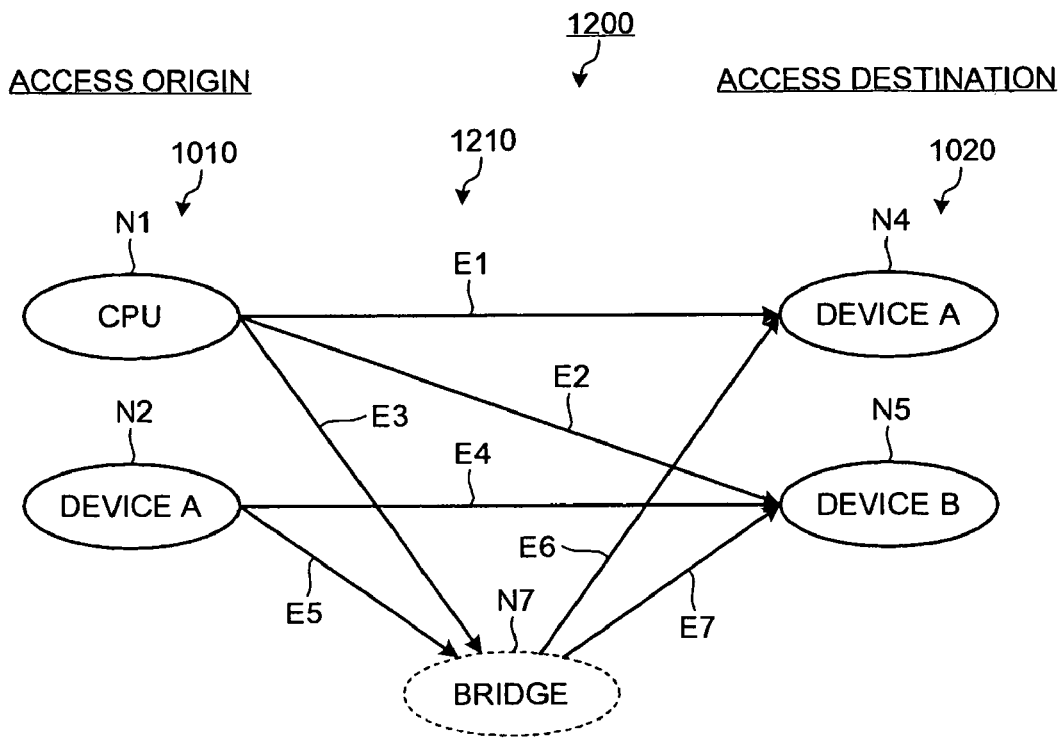
FIG. 13 is a schematic of an example of a correlation table.

Description is given for a specific example of a creating process by the creating unit 403 when creating a directed graph based on the specification information items 900-1 to 900-3 defined in the memory map 900. FIGS. 10 to 12 are schematics of the creating process.

As shown in FIG. 10, based on the data denoted by reference numerals 920 and 940 in the memory map 900, all the hardware blocks capable of being an access origin and all the hardware blocks capable of being an access destination in the bus system 200 are disposed in different columns 1010 and 1020 as nodes N1 to N6, respectively. In this case, hardware blocks capable of being both an access origin and an access destination are disposed in both the access destination column and the access origin column.

Subsequently, as shown in FIG. 11, a mark "M" is given to each of the nodes N3 and N6 that correspond to the bridge 208 to identify these nodes. In FIG. 11, the nodes N3 and N6 that correspond to the bridge 208 are each surrounded by a circle. Based on the specification information items 900-1 to 900-3, directed edges are connected from an access-origin hardware block, which is able to access an access-destination hardware block, to the access-destination hardware block.

Taking an example of the specification information item 900-1, directed edges E3 and E5 are respectively connected from the access origin nodes N1 and N2 (respectively representing the CPU 201 and the device A 202, which can access the bridge 208) to the access destination node N6 (representing the bridge 208). Directed edges E2, E4, and E7 are respectively connected from the access origin nodes N1, N2, and N3 (respectively representing the CPU 201, the device A 202, and the bridge 208, which can access the device B 203) to the access destination node N5 (representing the device B 203).

As shown in FIG. 12, the nodes N3 and N6 that correspond to the bridge 208 are consolidated into one node, a node N7. More specifically, the node N7 that corresponds to the bridge 208 is disposed in a column 1210 that is different from the columns 1010 and 1020. Furthermore, directed edges between nodes that form a self-loop are deleted. That is, directed edges connecting nodes for an access origin and an access destination that each represents the same hardware block are deleted.

When a directed edge connects nodes that cannot be physically connected due to the configuration of the bus system 200, the directed edge may be deleted. More specifically, for example, a directed edge between nodes that can not be physically connected to each other is detected by utilizing a search algorithm that searches for paths in the bus system 200, using the configuration model 600 shown in FIG. 6.

More specifically, taking a given access-destination hardware block, a path from the access-destination hardware block to an access-origin hardware block is searched for. As a result, when the path cannot be found, the directed edge connecting the nodes respectively representing those hardware blocks is deleted. In this case, no directed edge that corresponds to a self-loop or that cannot be connected is present.

As described, by executing the series of processes above, a directed graph 1200 can be created that indicates as nodes, the access-origin hardware blocks, the access-destination hardware blocks, and the bridge in the bus system 200.

With reference to the directed graph 1200, description is given respectively for specific examples of an extracting process by the extracting unit 401 and a searching process by the searching unit 402. The extracting unit 401 extracts from the directed graph 1200, either one of the nodes N4 and N5 that represent arbitrary access-destination hardware blocks. Subsequently, the searching unit 402, according to a directed edge, searches for a path reaching from the node extracted by the extracting unit 401 to a node representing an access-origin hardware block.

For example, when the node N4 is extracted from the directed graph 1200, by tracing the directed edges E1 and E6 that are connected to the node N4, the searching unit 402 finds paths reaching from the nodes N1 and N2, which respectively represent the CPU 201 and the device A 202 and are the access origins, to the node N4 representing the device A 202, which is the access destination. As described above, the path found in this case is a path that can logically be assumed and that is not necessarily a path that physically exists.

In this case, paths found include a path P1 of direct access from the CPU 201 (an access origin) to the device A 202 (the access destination), i.e., from the node N1 to the node N4; a path P2 of access from the CPU 201 (an access origin) to the device A 202 (the access destination) through the bridge 208, i.e., from the node N1 through the node N7 to the node N4; and a path P3 of access from the device A 202 (an access origin) to the device A 202 (the access destination) through the bridge 208, i.e., from the node N2 through the node N7 to the node N4.

When the node N5 is extracted from the directed graph 1200, by tracing the directed edges E2, E4, and E7 that are connected to the node N5, the searching unit 402 finds a path reaching from the nodes N1 and N2 that respectively represent the CPU 201 and the device A 202, which are access origins, to the node N5 representing the device B 203, which is the access destination.

As a result, paths found include a path P4 of direct access from the CPU 201 (an access origin) to the device B 203 (the access destination), i.e., from the node N1 to the node N5; a path P5 of access from the CPU 201 (an access origin) to the device B 203 (the access destination) through the bridge 208, i.e., from the node N1 through the node N7 to the node N5; a path P6 of direct access from the device A 202 (an access origin) to the device B 203 (the access destination), i.e., from the node N2 to the node N5; and a path P7 of access from the device A 202 (the access origin) to the device B 203 (the access destination) through the bridge 208, i.e., from the node N2 through the node N7 to the node N5.

Description is given for a specific example of a generating process by the generating unit 404. In this example, the generating unit 404 generates verification scenarios respectively for the paths P1 to P7 that are found by the searching unit 402. In this case, description is given for a case where the generating unit 404 generates the verification scenario for the path P1 utilizing the scenario template 500 shown in FIG. 5. The path P1 is a path of direct access from the CPU 201 (the access origin) to the device A 202 (the access destination).

In this case, based on the specification information item 900-2 in the memory map 900, a given character string is inserted into each of the insertion positions 510 to 540 of the scenario template 500. More specifically, the scenario name "Scenario 1" is inserted into the insertion position 510 and the access-origin hardware block name "CPU" is inserted into the insertion position 520.

The address "0x2000_0000 to 0x2000_FFFF" assigned to the access-destination hardware block is inserted into the insertion position 530. The transaction type "single transfer or burst transfer" is inserted into the insertion position 540. Thereby, the verification scenario for the path P1 can be generated.

As for the insertion position 510, the scenario names are inserted therein in order of "Scenario 1, Scenario 2, etc." according to the order of generation of the verification scenarios. The bridge is not handled as an access-origin hardware block. Hereinafter, the verification scenarios respectively for the paths P1 to P3 are shown respectively in Tables 1 to 3.

Table 1 indicates the verification scenario for the path P1, where the CPU 201 causes a direct transaction with the device A 202.

TABLE 1

| SCENARIO NAME: Scenario 1 | | |
| --- | --- | --- |
| ACCESS ORIGIN | ADDRESS | TRANSACTION |
| CPU | BETWEEN AND INCLUDING ADDRESSES 0x2000_0000 AND 0x2000_FFFF | SINGLE TRANSACTION OR BURST TRANSACTION |

Table 2 indicates the verification scenario for the path P2, where the CPU 201 causes a transaction with the device A 202 through the bridge 208.

TABLE 2

| SCENARIO NAME: Scenario 2 | | |
| --- | --- | --- |
| ACCESS ORIGIN | ADDRESS | TRANSACTION |
| CPU | BETWEEN AND INCLUDING ADDRESSES 0x2000_0000 AND 0x2000_FFFF | SINGLE TRANSACTION OR BURST TRANSACTION |

Table 3 indicated the verification scenario for the path P3, where the device A 202 causes a transaction with the device A 202 through the bridge 208.

TABLE 3

| SCENARIO NAME: Scenario 3 | | |
| --- | --- | --- |
| ACCESS ORIGIN | ADDRESS | TRANSACTION |
| DEVICE A | BETWEEN AND INCLUDING ADDRESSES 0x2000_0000 AND 0x2000_FFFF | SINGLE TRANSACTION OR BURST TRANSACTION |

Subsequently, the generating unit 404 generates combinations (hereinafter, "parallel scenarios") of the verification scenarios (hereinafter, "single scenarios") respectively for the paths P1 to P3. Parallel scenarios are formed by combining the three single scenarios that respectively have the names of "Scenario 1", "Scenario 2", and "Scenario 3".

(1) Parallel scenarios formed by combining two single scenarios
"Scenario 1∥Scenario 2, Scenario 1∥Scenario 3, and Scenario 2∥Scenario 3"

(2) Parallel scenario formed by combining three single scenarios
"Scenario 1∥Scenario 2∥Scenario 3"

Subsequently, unnecessary verification scenarios are deleted from among the verification scenarios (the single scenarios and the parallel scenarios) generated by the generating unit 404. More specifically, the deleting process shown in FIG. 8 is executed. In this case, the single scenario "Scenario 3" is unnecessary because this scenario is a verification scenario for the device A 202 causing a transaction with itself.

The single scenario "Scenario 2" is also unnecessary because this scenario is a verification scenario for the CPU 201 causing a transaction addressed to the device A 202 through the bridge 208 and this scenario is a verification scenario for a path that does not physically exist. Therefore, these two single scenarios and the parallel scenarios that include one or both of these single scenarios are deleted. As a result, only the single scenario "Scenario 1" among the verification scenarios generated by the generating unit 404 remains.

Similarly, verification scenarios for the paths P4 to P7 are generated by inserting given character strings respectively into the insertion positions 510 to 540 based on the specification information item 900-1. The verification scenarios for the paths P4 to P7 are indicated in Tables 4 to 7.

Table 4 indicates the verification scenario for the path P4, where the CPU 201 causes a direct transaction with the device B 203.

TABLE 4

| SCENARIO NAME: Scenario 4 | | |
| --- | --- | --- |
| ACCESS ORIGIN | ADDRESS | TRANSACTION |
| CPU | BETWEEN AND INCLUDING ADDRESSES 0x0000_0000 AND 0x1FFF_FFFF | BURST TRANSACTION |

Table 5 indicates the verification scenario for the path P5, where the CPU 201 causes a transaction with the device B 203 through the bridge 208.

TABLE 5

| SCENARIO NAME: Scenario 5 | | |
| --- | --- | --- |
| ACCESS ORIGIN | ADDRESS | TRANSACTION |
| CPU | BETWEEN AND INCLUDING ADDRESSES 0x0000_0000 AND 0x1FFF_FFFF | SINGLE TRANSACTION |

Table 6 indicates the verification scenario for the path P6, where the device A 202 causes a direct transaction with the device B 203.

TABLE 6

| SCENARIO NAME: Scenario 6 | | |
| --- | --- | --- |
| ACCESS ORIGIN | ADDRESS | TRANSACTION |
| DEVICE A | BETWEEN AND INCLUDING ADDRESSES 0X0000_0000 AND 0X1FFF_FFFF | BURST TRANSACTION |

Table 7 indicates the verification scenario for the path P7, where the device A 202 causes a transaction with the device B 203 through the bridge 208.

TABLE 7

SCENARIO NAME: Scenario 7

| ACCESS ORIGIN | ADDRESS | TRANSACTION |
|---|---|---|
| DEVICE A | BETWEEN ADDRESSES 0X0000_0000 AND 0X1FFF_FFFF INCLUDING THESE TWO ADDRESSES | SINGLE TRANSACTION |

Subsequently, the generating unit 404 generates parallel scenarios by combining the respective single scenarios for the paths P4 to P7. Parallel scenarios are formed by combining the four single scenarios that respectively have the names of "Scenario 4", "Scenario 5", "Scenario 6", and "scenario 7".

(3) Parallel scenarios formed by combining two single scenarios

"Scenario 4||Scenario 5, Scenario 4||Scenario 6, Scenario 4||Scenario 7, Scenario 5||Scenario 6, Scenario 5||Scenario 7, and Scenario 6||Scenario 7"

(4) Parallel scenarios formed by combining three single scenarios

"Scenario 4||Scenario 5||Scenario 6, Scenario 4||Scenario 5||Scenario 7, Scenario 4||Scenario 6||scenario 7, and Scenario 5||Scenario 6||Scenario 7"

(5) Parallel scenario formed by combining four single scenarios

"Scenario 4||Scenario 5||Scenario 6||Scenario 7"

Subsequently, unnecessary verification scenarios are deleted from among the verification scenarios (the single scenarios and the parallel scenarios) generated by the generating unit 404. In this case, no unnecessary verification scenario is present. However, transactions to the same bus line through the bridge 208 are generated with each of the single scenarios Scenario 5 and Scenario 7.

However, from the configuration model 600 shown in FIG. 6, it can be seen that the paths P5 and P7 are actually present. Therefore, the single scenarios Scenario 5 and Scenario 7 for the paths P5 and P7 are necessary. As a result, all of the verification scenarios generated by the generating unit 404 remain.

Finally, the output unit 405 outputs a correlation table that indicates the verification scenarios and the paths corresponding thereto. FIG. 13 is a schematic of an example of the correlation table. As shown in FIG. 13, a correlation table 1300 is a table indicating the scenario name of each verification scenario and the path name of a path corresponding thereto.

More specifically, for example, as indicated, the single scenario "Scenario 1" is correlated with the path P1, the parallel scenario "Scenario 4||Scenario 5" is correlated with the paths P4 and P5, and the parallel scenario "Scenario 4||Scenario 5||Scenario 6||Scenario 7" is correlated with the paths P4, P5, P6, and P7.

When verification of the bus system 200 is actually executed, by referring to the correlation table 1300, the single scenarios for each of the paths P1 to P7 are each executed separately and the parallel scenarios are executed according to the order of occurrence of transactions for parallel accessing.

Figure 14:
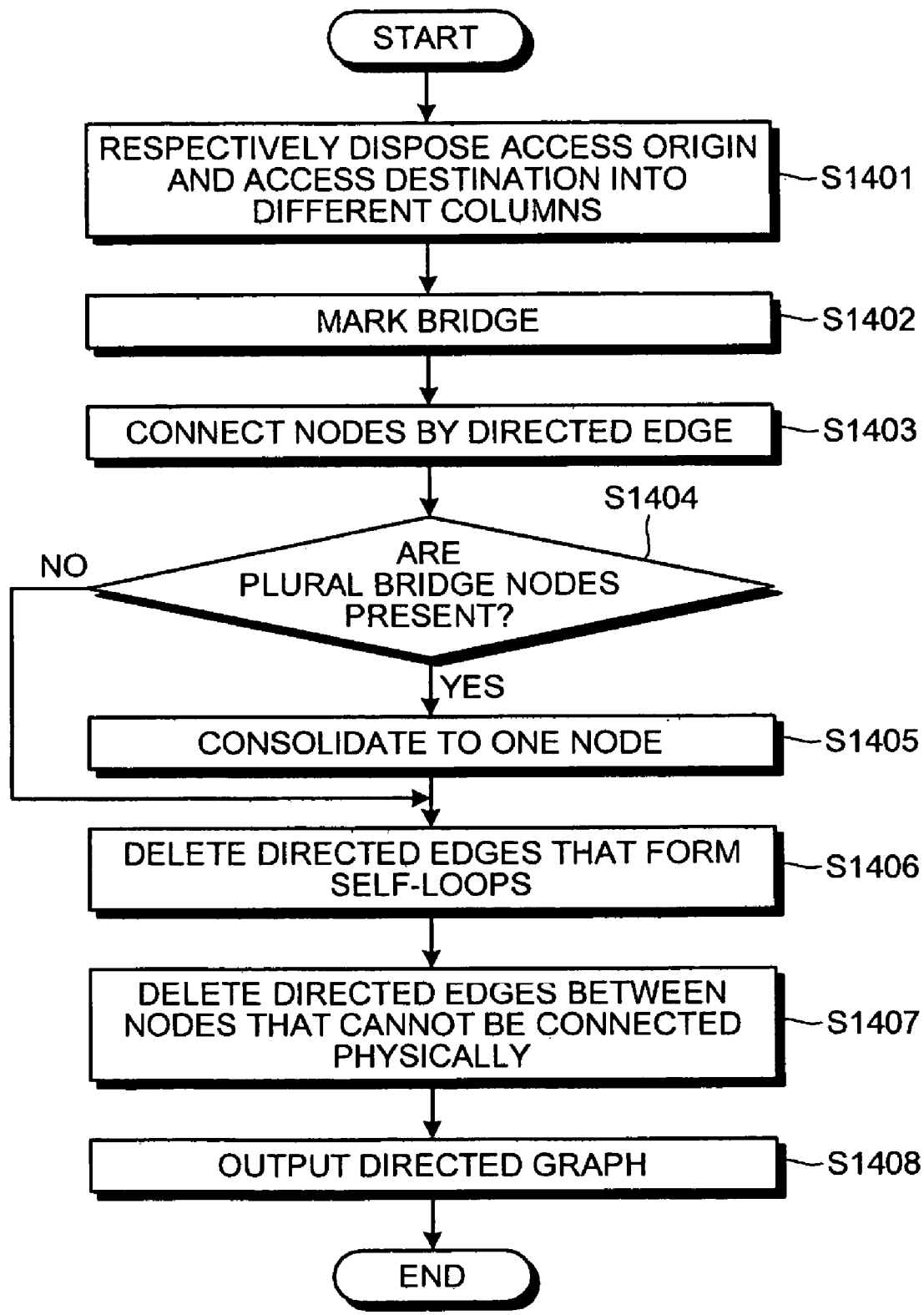
FIG. 14 is a flowchart of a specific procedure of the creating process.

FIG. 14 is a flowchart of a specific procedure of the creating process performed by the creating unit 403. As shown in the flowchart of FIG. 14, all of the hardware blocks that can be an access origin and all of the hardware blocks that can be an access destination in the bus system are disposed respectively in different columns as nodes (step S1401).

A mark is given to identify a node that corresponds to a bridge (step S1402) and a directed edge is connected from an access-origin hardware block that can access an access-destination hardware block, to the access-destination hardware block (step S1403).

Whether plural nodes respectively corresponding to a bridge are present is judged (step S1404). When plural nodes are present (step S1404: YES), the nodes are consolidated into one node (step S1405). Directed edges between nodes that result in a self-loop are deleted (step S1406) and directed edges between nodes that cannot physically be connected are deleted (step S1407).

Finally, a directed graph consequently generated is output (step S1408) and a series of the processes according to the flowchart comes to an end. When plural nodes respectively corresponding to a bridge are not present at step S1404 (step S1404: NO), the procedure proceeds to step S1406.

Figure 15:
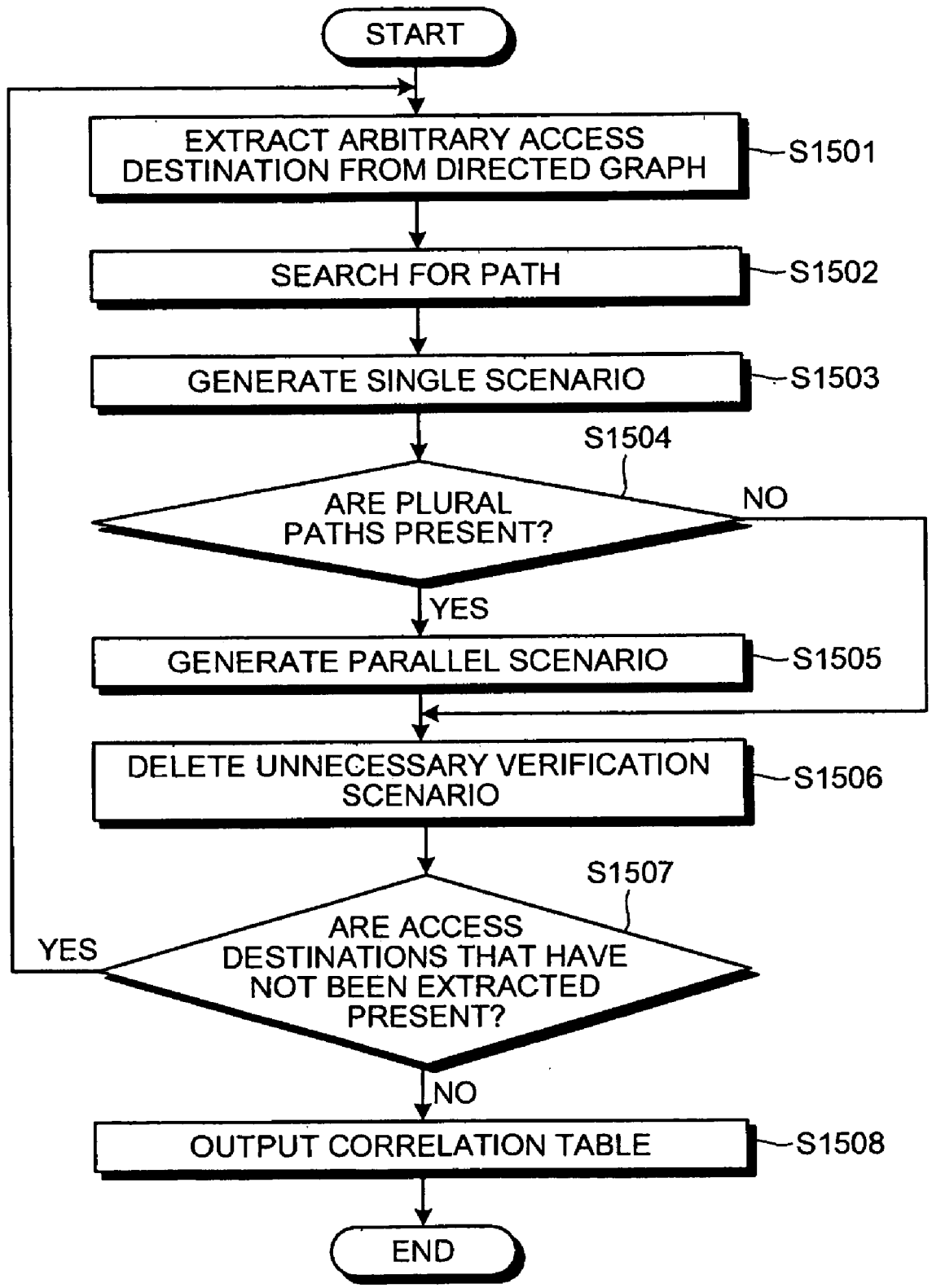
FIG. 15 is a flowchart of a specific process of the verification-scenario generating process.

FIG. 15 is a flowchart of a specific process of the verification-scenario generating process. As shown in the flowchart of FIG. 15, the extracting unit 401 extracts a node that represents an arbitrary access-destination hardware block from the directed graph created by the creating unit 403 (step S1501).

The searching unit 402 searches for a path reaching from the node extracted by the extracting unit 401 to a node that represents the access-origin hardware block, by tracing directed edges that connect nodes in the directed graph (step S1502). The generating unit 404 generates single scenarios respectively for paths found by the searching unit 402 (step S1503).

Whether plural paths are found at step S1502 is judged (step S1504). When plural paths are found (step S1504: YES), the generating unit 404 generates parallel scenarios by combining single scenarios that respectively are for paths generated at step S1503 (step S1505).

The deleting unit 406 deletes unnecessary verification scenarios (step S1506). It is judged whether any node that represents an access-destination hardware block that has not been extracted is present (step S1507). When a node is present that represents an access-destination hardware block that has not been extracted (step S1507: YES), the procedure returns to step S1501 and the series of processes are repeated.

On the other hand, when no node is present that represents an access-destination hardware block that has not been extracted (step S1507: NO), the output unit 405 outputs a correlation table that indicates verification scenarios and the paths respectively corresponding thereto (step S1508), and the series of processes according to the flowchart comes to an end. When plural paths are not found at step S1504 (step S1504: NO), the procedure proceeds to step S1506.

The example enables collective and automatic generation of single scenarios respectively for the paths necessary for verifying the bus system 200 and of parallel scenarios formed by combining the single scenarios, based on the memory map 900. Thereby, the troublesome manual work of extracting path information from the design specification is made unnecessary and, therefore, the verification work load can be reduced and improvement of the verification quality can be facilitated.

Particularly, in a bus system having plural bus lines that are connected by bridges, because the number of necessary verification scenarios is tremendous, verification scenarios can be more efficiently and collectively generated compared to manual generation. Because the verification scenarios unnecessary for the verification of the bus system are deleted, unnecessary verification work can be eliminated and a reduction of the verification period can be facilitated.

As described above, the embodiment enables facilitation of a reduction in the load on the person who verifies a bus system and in the design period by efficiently and collectively generating verification scenarios necessary for verifying a bus system.

The method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

The verification-scenario generating apparatus 100 described in the present embodiment can be realized by an application specific integrated circuit (ASIC) such as a standard cell or a structured ASIC or a programmable logic device (PLD) such as a field-programmable gate array (FPGA). Specifically, for example, by defining the functions of the units 401 to 409 of the verification-scenario generating apparatus 100 by hardware description language (HDL) description and logically synthesizing the HDL description to the ASIC or PLD, the verification-scenario generating apparatus 100 can be manufactured.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A non-transitory computer-readable recording medium storing therein a computer program that is for verification-scenario generation and that causes a computer to execute:
   extracting from among a plurality of hardware blocks that constitute a bus system to be verified, an access-origin hardware block and an access-destination hardware block;
   searching for a path reaching from the access-origin hardware block to the access-destination hardware block;
   generating, for each path found at the searching, a verification scenario which is used for verifying a transaction of the access-origin hardware block for a case where access to an address range assigned to the access-destination hardware block occurs;
   outputting the verification scenario which is associated with the path; and
   deleting the verification scenario for a path where the access-origin hardware block of the path is substantially the same as the access-destination hardware block of the path.

2. The non-transitory computer-readable recording medium according to claim 1, wherein the generating includes generating, when a plurality of paths are found at the searching, a parallel verification scenario for a case where competing access to the address range occurs, by combining the verification scenarios respectively generated for each of the paths.

3. The non-transitory computer-readable recording medium according to claim 1, wherein the verification scenario output at the outputting is the verification scenario that remains after the deleting.

4. The non-transitory computer-readable recording medium according to claim 3, wherein
   the computer program further causes the computer to execute:
   detecting in a first bus line, an access-origin hardware block and an access-destination hardware block that respectively belong to the first bus line;
   retrieving, from among a plurality of paths found at the searching, a path that is between the access-origin hardware block and the access-destination hardware block detected at the detecting and that passes through a second bus line that is different from the first bus line; and
   determining whether the access-destination hardware block in the path retrieved at the retrieving belongs to the second bus line, and
   the deleting includes deleting the verification scenario correlated with the path retrieved at the retrieving, when the access-destination hardware block is determined at the determining to not belong to the second bus line.

5. A non-transitory computer-readable recording medium storing therein a computer program that is for verification-scenario generation and that causes a computer to execute:
   extracting from among a plurality of hardware blocks that constitute a bus system to be verified, an access-origin hardware block and an access-destination hardware block;
   searching for a path reaching from the access-origin hardware block to the access-destination hardware block;
   generating, for each path found at the searching, a verification scenario which is used for verifying a transaction of the access-origin hardware block for a case where access to an address range assigned to the access-destination hardware block occurs;
   outputting the verification scenario which is associated with the path; and
   creating a directed graph indicating respectively as nodes, the access-origin hardware block, the access-destination hardware block, and a bridge connecting different bus lines in the bus system, wherein:
   the extracting includes extracting, an arbitrary access-destination hardware block from the directed graph, and
   the searching includes searching for, by tracing directed edges connecting the nodes in the directed graph, a path from the arbitrary access-destination hardware block to an access-origin hardware block that can access the arbitrary access-destination hardware block.

6. The non-transitory computer-readable recording medium according to claim 5, wherein the creating includes creating the directed graph based on a memory map that defines an address range to access a hardware block in the bus system and a combination of an access-origin hardware block and an access-destination hardware block that are mutually accessible.

7. The non-transitory computer-readable recording medium according to claim 6, wherein the generating of the verification scenario includes generating based on the memory map that defines transactions available for the hardware blocks.

8. A verification-scenario generating apparatus comprising:
   an extracting unit that extracts from among a plurality of hardware blocks that constitute a bus system to be verified, an access-origin hardware block and an access-destination hardware block;

a searching unit that searches for a path reaching from the access-origin hardware block to the access-destination hardware block;

a generating unit that, for each path found by the searching unit, generates a verification scenario which is used for verifying a transaction of the access-origin hardware block for a case where access to an address range assigned to the access-destination hardware block occurs;

an output unit that outputs the verification scenario which is associated with the path; and a deleting unit that deletes the verification scenario for a path where the access-origin hardware block of the path is substantially the same as the access-destination hardware block of the path.

9. A verification-scenario generating method comprising:

extracting, by using a computer, from among a plurality of hardware blocks that constitute a bus system to be verified, an access-origin hardware block and an access-destination hardware block;

searching for a path reaching from the access-origin hardware block to the access-destination hardware block;

generating, for each path found at the searching, a verification scenario which is used for verifying a transaction of the access-origin hardware block for a case where access to an address range assigned to the access-destination hardware block occurs;

outputting the verification scenario which is associated with the path; and deleting the verification scenario for a path where the access-origin hardware block of the path is substantially the same as the access-destination hardware block of the path.

* * * * *

UNITED STATES PATENT AND TRADEMARK OFFICE
CERTIFICATE OF CORRECTION

| | | |
|---|---|---|
| PATENT NO. | : 8,117,573 B2 | Page 1 of 1 |
| APPLICATION NO. | : 12/230110 | |
| DATED | : February 14, 2012 | |
| INVENTOR(S) | : Rafael Kazumiti Morizawa | |

It is certified that error appears in the above-identified patent and that said Letters Patent is hereby corrected as shown below:

Column 16, Line 41, in Claim 5, delete "extracting," and insert -- extracting --, therefor.

Signed and Sealed this
Seventeenth Day of April, 2012

David J. Kappos
*Director of the United States Patent and Trademark Office*